United States Patent [19]

Holmes

[11] 3,835,399

[45] Sept. 10, 1974

[54] ADJUSTABLE ELECTRONIC TUNABLE FILTER WITH SIMULATED INDUCTOR

[76] Inventor: Robert S. Holmes, 151 Westland Ave., Rochester, N.Y. 14618

[22] Filed: June 4, 1973

[21] Appl. No.: 366,638

Related U.S. Application Data

[63] Continuation of Ser. No. 220,059, Jan. 24, 1972, abandoned.

[52] U.S. Cl. .................................. 328/167, 330/69

[51] Int. Cl. .............................................. H03b 1/04

[58] Field of Search ........... 328/149, 155, 167, 170, 328/268; 307/232, 295; 330/9, 68, 69; 333/17

[56] References Cited

UNITED STATES PATENTS

| | | | |
|---|---|---|---|
| 1,692,257 | 11/1928 | Hareltine | 330/68 |
| 1,771,913 | 7/1930 | Bradbury | 330/68 |
| 3,577,090 | 5/1971 | Montgomery | 330/69 |
| 3,588,752 | 6/1971 | Hirshfield | 333/17 |
| 3,614,475 | 10/1971 | Deboo | 328/155 |
| 3,678,416 | 7/1972 | Burwen | 328/167 |
| 3,696,252 | 10/1972 | Chapman | 328/167 |

OTHER PUBLICATIONS

Philbrick/Nexus, "App Manual for Op Amplifiers", 2–1968, pages 69, 74, 75, 76, 77.

Markus, "Electronic Circuits Manual", McGraw Hill 1971, Lib. of Congress Cat. Card No. 70–152007, pages 57, 88, 237, 239 & 895.

Harvey, "Systems Applications for Voltage Controlled Air Filters", Aritech Corp. Reprint from EEE Oct. 1969 4 pages.

Salerno, "Active Filters", Electronics, Feb. 17, 1969, pages 100–105.

*Primary Examiner*—John S. Heyman

[57] ABSTRACT

A stable tunable Q bandpass filter adapted to have its parameters dynamically varied over a wide range of bandwidths and center frequencies. The filter includes a capacitor and a network coupled in parallel across the capacitor. The network includes a plurality of operational amplifiers coupled to simulate an inductor without utilizing coils. A feature of the filter is that it can be readily made adaptive to track an input signal which may randomly vary in frequency. A further feature of the invention is to have one input of each operational amplifier coupled directly to ground to minimize stray capacitance. The performance characteristics of this filter are in part attained by the method of component layout and shielding techniques used, in addition to the method of circuit excitation.

5 Claims, 7 Drawing Figures

ADJUSTABLE ELECTRONIC TUNABLE FILTER WITH SIMULATED INDUCTOR

This is a continuation of U.S. Patent application Ser. No. 220.059 filed Jan. 24, 1972 now abandoned.

BACKGROUND OF THE INVENTION

Field of the Invention

The present invention relates to electronic bandpass filters which utilize active components simulating an inductor.

The basic components of a passive bandpass filter are shown in FIG. 1 to comprise an adjustable resistor $R_1$ coupled in series with the parallel connection of a capacitor $C_1$ and an inductor $L_1$. The input voltage to such circuit is shown as $E_i$ and the output $E_o$. It can be shown that if $C_1$ and $L_1$ were ideal lossless lumped components, then the response of this circuit would be that of a bandpass filter of center frequency $W2 = 1/L_1C_1$, bandwidth $1/R_1C_1$ and with unity gain at the center frequency.

In practice, however, it is not possible to obtain filters with a Q-factor of more than approximately 2,000. As a result of this, the circuit of FIG. 1 would suffer a decrease in center frequency gain for values of overall circuit Q which are not small compared to 2,000. Further, coils do not provide an ideal inductance parameter (L) and may further provide stray capacitance and resistance. Heretofore, circuits have been devised which utilize operational amplifiers to simulate an inductance parameter. Among the disadvantages of such circuits is the problem of making them tunable over a wide frequency, while still simulating a stable inductance.

SUMMARY OF THE INVENTION

It is an object of this invention to provide a stable tunable overwide frequency high Q electronic filter wherein the inductance parameter is very stable and is simulated by active elements without utilizing a coil.

A further object of this invention is to simulate inductance utilizing operational amplifiers and to eliminate stray capacitance between the input and output terminals of such operational amplifiers, thus minimizing phase shifts which would degrade performance.

A still further object of the invention is to provide a bandpass filter which includes a network for simulating inductance without utilizing a coil and in which power losses in the network and the filter capacitor are offset by injecting an equal amount energy lost per cycle into the inductance simulating network.

In accordance with a disclosed embodiment of the invention, a bandpass filter includes a resistor in series with a tank circuit having a capacitor and a plurality of operational amplifiers coupled to simulate inductance, with the reference input terminal of each operational amplifier directly coupled to ground and to employ shielding, thereby minimizing stray capacitance.

The present invention contemplates a bandpass filter in accordance therewith and a phase-lock loop arrangement which permits such filter to be adaptive.

DESCRIPTION OF THE PREFERRED EMBODIMENT

Figures 1, 2, 3, 4, 5, 6, 7:
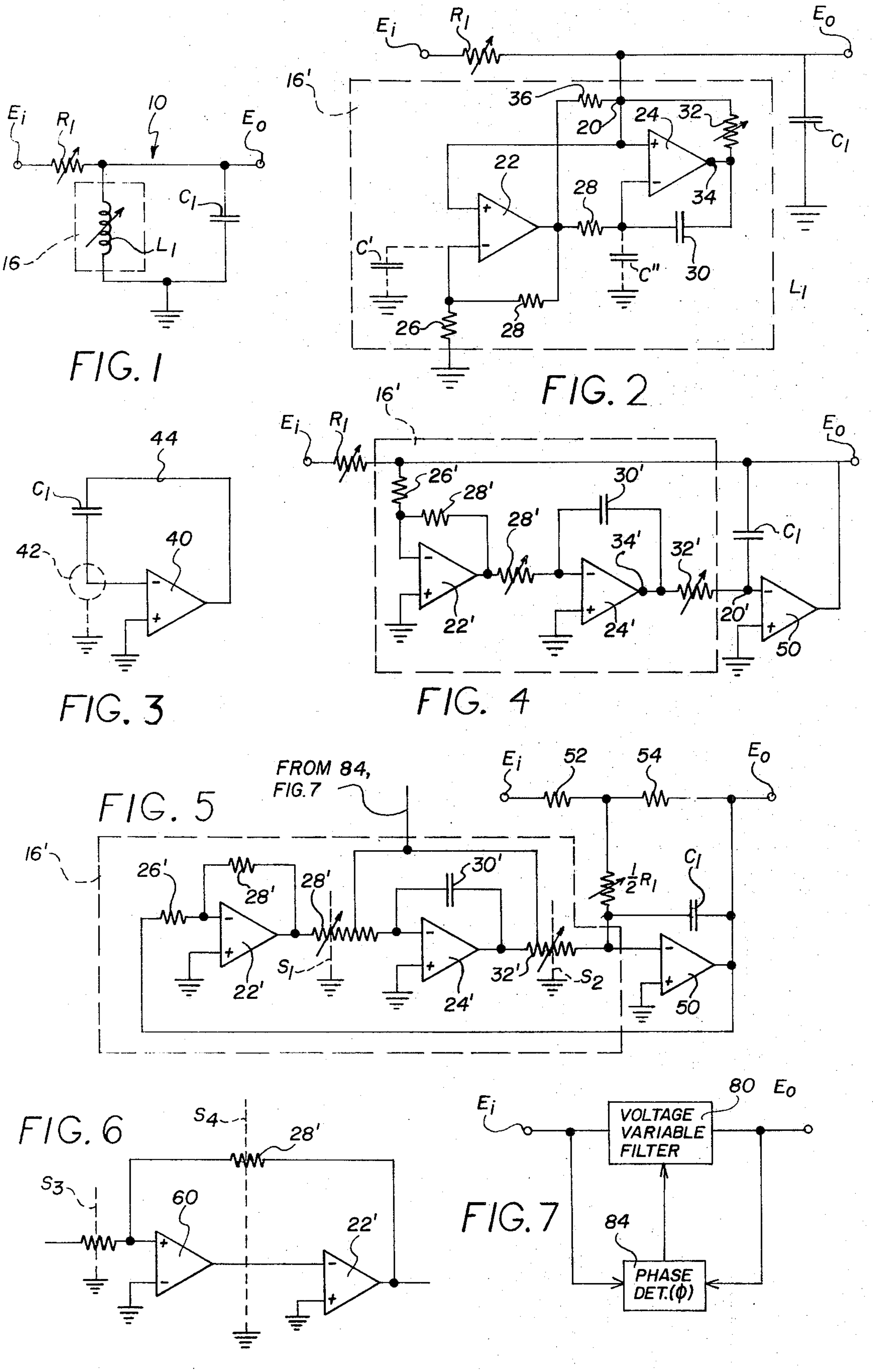
FIG. 1 is a schematic diagram of a conventional bandpass filter.
FIG. 2 is a schematic diagram of a bandpass filter utilizing operational amplifiers which illustrates certain aspects of the invention but which suffers from certain disadvantages.
FIG. 3 shows an operational amplifier with one input directly coupled to ground potential which may be used in circuits in accordance with the invention.
FIG. 4 is another embodiment of the invention which employs the operational amplifiers in the configuration shown in FIG. 3.
FIG. 5 shows the circuit of FIG. 4 with a resistive network for injecting energy into the inductance simulation means.
FIG. 6 shows a shielding structure for preventing stray capacitance.
FIG. 7 is a block diagram of a bandpass filter coupled to a phase lock loop to make such filter adaptive.

Turning first to FIG. 1, a conventional turntable High-Q bandpass filter 10 is shown wherein an adjustable resistor $R_1$ is coupled in series which a tank circuit having a capacitor $C_1$ and an inductor $L_1$ shown as an adjustable coil whose inductance is variable. The filter 10 is well understood in the art and will not be discussed further. It should be noted that the coil $L_1$ is shown in a dotted line box 16 to denote the fact that in accordance with the invention the variable inductor is simulated by a network 16' having a plurality of operational amplifiers, resistors and capacitors.

Turning now to FIG. 2, a filter circuit is shown which has a simulated inductance 16' but which suffers from many disadvantages but is illustrated to aid in understanding certain aspects of the invention and to point out such disadvantages which are cured in following embodiments. In this circuit, the voltage $E_o$ at inductor input junction 20 is provided as an input to the (+) or non-inverting reference input terminals of operational amplifiers 22 and 24. The (−) or inverting input is coupled to directly ground by a resistor 26. A resistor 28 is selected to have the same value of resistance as the resistor 26 and is coupled between the output terminal and the electrical junction of the resistor 26 and the inverting input terminal of the operational amplifier 22. In operation, the voltage at the output terminal of the amplifier 22 is substantially two (2) times the voltage at the input junction 20. A resistor 28 couples the amplifier 22 to the inverting input terminal of the amplifier 24. A feedback capacitor 30 causes the amplifier 24 to function as an integrator. The variable resistor couples the output terminal 34 of the amplifier 24 to the junction 20.

The operation of the inductor means 16' will now be described. Where circuit parameters of components are given, the typical symbols (C = Capacitance, L = Inductance, and R = Resistance) are used with corresponding circuit element identified by subscript. As has been pointed out, the voltage at the output or amplifier 22 is $2E_o$. Further, since amplifier 24 is connected as an integrator, and is responsive to such voltage produced by amplifier 22 to produce a voltage which, if measured relative to junction 20 is equal to $-1/R_{28}C_{30} \int E_o\, dt$. This causes a current to flow into junction 20 through adjustable resistor 32 equal to $-1/R_{32}R_{28}C_{30} \int E^\circ\, dt$.

The resistor 36 couples the output of the amplifier 22 and the junction 20 causing a current to flow in phase with the excitation voltage into terminal 20, which would add power at the same rate it was being dissipated in the simulated inductance 16' and $C_1$.

The circuit of FIG. 2 has disadvantages due to the fact that it contains an implicit feedback loop with extremely small stability margins. In particular, it is unusually intolerant of extraneous phase shifts induced by stray capacitances, shown in dotted lines as c′ and c″, and may not tolerate more than 1/Q radians of cumulative phase lag before becoming unstable, where Q is the sum of the Q-factors of $C_1$ and $C_{30}$. Nevertheless, this circuit performs satisfactorily for reduced overall circuit Q values by using relatively lossy capacitors, such as paper film capacitors, or for reduced frequency ranges by trimming the phase characteristics with small capacitors.

As contemplated by the present invention to eliminate the major source of phase shifts is to eliminate the effects of stray capacitances from amplifier inputs to ground.

It has been determined that a network in accordance with the invention which simulates inductance can be arranged such that all amplifier inputs be inherently servoed to ground potential, thereby eliminating current pickups due to stray capacitances to ground.

Since any excitation cannot occur at an amplifier output, it follows that excitation must occur at a ground point. Normally, the capacitor $C_1$ of FIG. 1 is grounded directly. However, it can be just as effectively grounded by employing the concept illustrated in FIG. 3. The operational amplifier 40 causes point 42 to remain at ground potential at all times as shown by the dotted lines. What has happened here is that the point 44 can no longer be used as an independent variable: it cannot be used for any input function; however, point 42 can be used as a current input for which the voltage at 44 will respond exactly the same but with opposite sign as if the current had been applied at 44: $C_1$ has become a "two port" grounded capacitor.

Utilizing the amplifier structure of FIG. 3, a "virtual inductor" in accordance with the invention can be constructed; i.e., an inductor which uses the voltage at point 44 to derive the proper current to draw from point 44, except that it does so by acting through the virtual ground at point 42 as just mentioned: i.e., it is a "two port" grounded inductor.

Such a circuit is shown in FIG. 4 where components perform similar functions to those described for the circuit in FIG. 2, the same numerals will be used but they will be primed. The operation of virtual inductor 16′ proceeds as follows: the input voltage E to the inverting input is inverted by amplifier network 22′ to produce a voltage say −E in turn. This is integrated by amplifier network 24′ to produce a voltage at point 34′ of $-1/R_{28'}C_{30'}\int E\ dt$. This causes a current of $-1/R_{32'}R_{28'}C_{30'}\int E\ dt$ to flow into 20′.

FIG. 5 is identical with FIG. 4 except for a resistive network consisting of resistors 52 and 54 (which have substantially equal resistance) and adjustable resistor $1/2R_1$ (which corresponds to the resistor $R_1$ of FIG. 4 but is one-half its resistance value.) The resistive value of both of 51 and 54 are each selected to be considerably smaller than that of $R_1$. This resistive network solves problem of reduced gain at high values of overall circuit Q by injecting energy by means of a properly selected resistor value from the input $E_i$ to the point 20′.

It should be noted that the resistors 28′ and 32′ are shown joined together to permit their simultaneous adjustment. Further conventional shields $S_1$ and $S_2$ are provided to limit stray capacitance and intersect resistors 28′ and 32′.

A further stray capacitance problem still remains with the amplifier 22′, however, which is due to stray capacitances between outputs and inputs which contribute to instability. Interstage shielding can be employed to eliminate most of these effects, however, the output of amplifier 22′ cannot be shielded from its input effectively. This is critical, since capacitance at this point introduces a minute additional phase lag, and as mentioned previously, the feedback loop is extremely intolerant of such extraneous phase shifts. The circuit of FIG. 5 comprises a feedback loop containing operational amplifiers which provide a good approximation of two intergrators and an invertor. Controlling the phase of the feedback loop is extremely important. By utilizing the configuration shown in FIG. 3, capacitor dissipations remain small, amplifier phase remains constant or gain is very high, and stray capacitance does not change. The various values of the parameters of the circuit elements must be selected with this in mind.

In FIG. 6 an improved operational amplifier 22′ comprises a gain-of-one impedance matching amplifier 60 coupled in series to the amplifier 22′, and employing shielding as shown by the dotted lines. No current will flow through stray capacitance c‴, since the entire portion of the circuit between shields $S_3$ and $S_4$ is a virtual ground; while current which flows through *c′* can have no effect on the response of the circuit, since it is wholly absorbed by the low impedance output of the amplifier 60.

In FIG. 7, a tunable filter 80 in accordance with the invention such as shown in FIG. 5 can be made to track the input signal $E_i$ which is slowly varying in frequency, thus, and is an "adaptive" filter. The techniques to make the filter 80 adaptive are well known in the art as so will be briefly described. The input and outputs of the filter 80 are compared at a phase detector 84. If a signal is present within the nominal bandpass of the filter, phase information will be detected which is a direct indication of the position of that signal within the filter's bandpass. This information can be used to adjust the center frequency of the filter 80 by adjusting the resistors 28′ and 32′ (of FIG. 5) to bring it into coincidence with the signal $E_i$. The resistors 28′ and 32′ can be analog multipliers, well known in the art, voltage variable resistors such as photoresistive devices and wherein the output of the phase detector controlls the intensity of illumination of these devices to adjust their resistance parameter. Further, the resistors may be synthesized by utilizing digital techniques also well understood in the art. It is a feature of the invention that lock indicator (not shown) may be provided from the phase detector 84 and can further be utilized by a suitable Sweep and Control Logic Module to perform various functions such as sweeping to locate signals, bandwidth narrowing after a signal has been acquired, etc., depending on the proper action as specified by various function control signals all as will be well understood to those skilled in the art.

In operation, if a spectral line ($E_i$) appears at the input terminal of the filter 80 (within its bandpass) it appears at the output terminal ($E_o$) but phase-shifted (we are measuring on frequency parameters) depending on where it is in the bandpass. The phase detector 84 will compare this phase shift and produce a connection voltage to the filter 80 which adjusts the resistance of the resistors 28' and 32' to correct for any deviation from the center of the bandpass. Hence, it will track or "adapt" to the frequency of the spectral line. Thus, it is apparent that there has been provided, in accordance with the invention, a tunable high-Q filter that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of this disclosure.

I claim:

1. In a bandpass filter for operating upon an input signal applied to an input signal terminal and produce an output signal at an output signal terminal, the improvement comprising:

a. a first capacitor;

b. induction simulating means including (i) a first operational amplifier having first and second input terminals with said first operational amplifier input terminal being coupled to the signal output terminal and said second operational amplifier input terminal being coupled to ground potential and a feedback resistor coupled between said first operational input terminal and said first operational amplifier output terminal; (ii) integration means including a second operational amplifier having first and second input terminals and an output terminal and a second capacitor coupled between said second amplifier output and first input terminals, said second amplifier input terminal being coupled to ground potential and said first input terminal being coupled to said output terminal of said first operational amplifier; and (iii) a third operational amplifier having first and second input terminals and an output terminal with said first input terminal of said third operational amplifier being coupled to said second operational amplifier output terminal and said second input terminal of said third operational amplifier being coupled to ground potential and said output terminal of said third operational amplifier being coupled to said first capacitor, said first input terminal of said third operational amplifier also being coupled to said first capacitor and maintained at a virtually ground potential whereby stray capacitance is minimized; and c. two resistors having substantially equal resistance parameters being coupled in series between the input signal and output signal terminals and a third resistor having a smaller resistance parameter than said first two resistors and electrically connecting the junction of said first two resistors to said first capacitor for injecting energy from the input signal into the first input terminal of said third operational amplifier to maintain the bandwidth of the filter substantially independent of the tuned center frequency of the filter.

2. The invention as set forth in claim 1 including a plurality of shields disposed in selected locations relative to the input and output terminals of particular ones of said operational amplifiers to minimize stray capacitance.

3. The invention as set forth in claim 2 including a gain of one amplifier disposed at said first input terminal of said first operational amplifier and wherein said feedback resistor is coupled between said output terminal of said first operational amplifier and the input of said gain of one amplifier and wherein one of said shields is disposed at the output of said first operational amplifier and said gain of one amplifier and intersects said feedback resistor.

4. The invention as set forth in claim 1 including a phase detector coupled to the signal input and output terminals and responsive to variations in a parameter of the input signal from such parameter of the output signal to apply a signal to said induction simulating means to adjust the filter bandpass.

5. The invention as set forth in claim 4 wherein said signal from said phase detector is applied to the first input terminals of said second and third operational amplifiers.

* * * * *